(12) United States Patent
Wolf

(10) Patent No.: US 6,577,693 B1
(45) Date of Patent: Jun. 10, 2003

(54) DESYNCHRONIZER FOR A SYNCHRONOUS DIGITAL COMMUNICATIONS SYSTEM

(75) Inventor: Michael Wolf, Mundelsheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/300,476

(22) Filed: Apr. 28, 1999

(30) Foreign Application Priority Data

May 8, 1998 (DE) .......................................... 198 20 572

(51) Int. Cl.[7] .................................................. H04L 7/04
(52) U.S. Cl. ...................................... 375/372; 370/506
(58) Field of Search ............................... 375/372, 371, 375/326; 370/506

(56) References Cited

U.S. PATENT DOCUMENTS

| | | | |
|---|---|---|---|
| 4,942,593 A | | 7/1990 | Whiteside et al. |
| 5,343,476 A | * | 8/1994 | Urbansky ............... 365/189.05 |
| 5,528,530 A | * | 6/1996 | Powell et al. ................ 708/490 |

FOREIGN PATENT DOCUMENTS

| | | |
|---|---|---|
| DE | 40 14 814 A1 | 11/1991 |
| DE | 40 25 831 A1 | 2/1992 |
| DE | 41 08 429 A1 | 9/1992 |
| DE | 41 21 863 A1 | 1/1993 |
| DE | 38 42 371 C2 | 4/1997 |
| DE | 195 37 361 A1 | 4/1997 |

OTHER PUBLICATIONS

ITU–T Recommendation G.707 (Mat. 1996).
M. Klein and R. Urbansky, "SONET/SDH Pointer Processor Implementations", 1994, Conference Record, pp. 655–660.

* cited by examiner

Primary Examiner—Stephen Chin
Assistant Examiner—Kevin Kim
(74) Attorney, Agent, or Firm—Sughrue Mion, PLLC

(57) ABSTRACT

A desynchonizer for a synchronous digital communications system serves to recover a useful signal from a synchronous digital input signal. It comprises a buffer for temporarily storing the input signal, a write circuit for writing the input signal into the buffer, a clock-generating circuit for generating a clock signal, and a read circuit for reading the contents of the buffer at the recovered clock rate. According to the invention, the clock-generating circuit includes a calculating circuit for determining an average over the interval between two pointer actions of the input signal, and derives from the average a tuning signal which serves to adjust the recovered clock signal. In this manner, jitter caused by pointer actions which result from a constant offset of the effective bit rate of the received virtual containers is eliminated.

11 Claims, 2 Drawing Sheets

DESYNCHRONIZER FOR A SYNCHRONOUS DIGITAL COMMUNICATIONS SYSTEM

BACKGROUND OF THE INVENTION

This invention relates to a desynchronizer for a synchronous digital communications system as set forth in the preamble of claim 1, and to a method of generating a jitter-reduced output signal from a synchronous digital input signal as set forth in the preamble of the claim 6.

Synchronous digital communications systems are based on recommendations of the ITU-T for SDH (synchronous digital hierarchy) or SONET (synchronous optical network). According to ITU-T Recommendation G.707 (03/96), page 6, message signals to be transmitted are packaged in virtual containers and nested in a synchronous transport module. The synchronous transport module is then transmitted. For each possible virtual container, a bit rate is defined in the Recommendation.

During transmission, low-frequency phase variations caused by temporary storage in different buffers of the communications system may add up. Such low-frequency phase variations are referred to as "wander" and may result in buffers overflowing, so that data may be lost. One way of reducing or avoiding such wander is to use for the virtual container a slightly higher or lower bit rate than that specified in the Recommendation. By this measure, the fill level of buffers of intermediate network elements is shifted to the range of the lower or upper limit and held there, thereby reducing the adding up of wander. On the other hand, the number of pointer actions is increased in order to compensate for the difference in bit rate. This results in increased jitter.

From M. Klein and R. Urbansky, "SONET/SDH Pointer Processor Implementation", 1994 IEEE GLOBECOM Communications: The Global Bridge, San Francisco, Nov. 28–Dec. 2, 1994, Conference Record, pp. 655–660, a synchronizer for SDH or SONET systems is known which produces a synchronous output signal from plesiochronous or pseudo-synchronous digital input signals. The output signal is transported through the communications system and fed at the other end to a desynchronizer to recover the original plesiochronous or pseudo-synchronous message signals. The desynchronizer includes a buffer in which the received signals are stored and from which they are read at a recovered clock rate to obtain the original message signal. As a measure for adjusting the recovered clock, the fill level of the buffer is used, which is determined from the write and read clocks of the buffer by means of a phase detector. Jitter is reduced by low-pass-filtering the recovered clock.

SUMMARY OF THE INVENTION

The desynchronizer known from Urbanskiy is not suited for effectively reducing the low-frequency jitter caused by pointer actions.

It is therefore an object of the invention to provide a desynchronizer for a synchronous digital communications system which is capable of effectively suppressing jitter caused by pointer actions. Another object of the invention is to provide a method of generating a jitter-reduced output signal from a synchronous digital input signal.

BRIEF DESCRIPTION OF THE DRAWINGS

These objects are attained by the features of claim 1 and claim 6, respectively. Further advantageous aspects of the invention are defined in the dependent claims.

The invention will become more apparent from the following description of two embodiments when taken in conjunction with the accompanying drawings, in which.

DETAILED DESCRIPTION OF THE INVENTION

The invention is based on the fact that an input signal received by a desynchronizer contains virtual containers with a bit rate different from the standardized value. Assuming that this bit rate is constant, the invention is predicated on recognition that the virtual containers are received with a steady sequence of pointer actions, also referred to as pointer justifications. The time distance between the pointer actions need not necessarily be constant, however. Starting from this recognition, a fundamental idea of the invention is to perform digital averaging over the interval between two pointer actions and to use this average as a measure of an adjustment of a clock generator which serves to generate a recovered clock signal used as a read clock.

Figure 1:
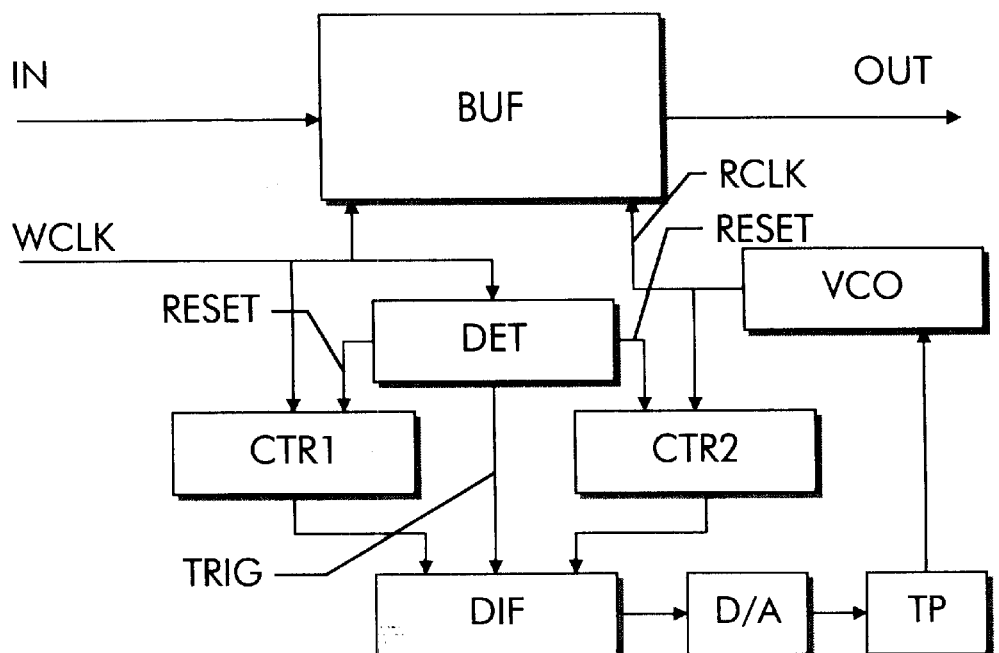
FIG. 1 is a block diagram of a first embodiment of a desynchronizer in accordance with the invention.

FIG. 1 shows a first embodiment of a desynchronizer working on this principle. The desynchronizer receives, at an input IN, a synchronous digital message signal which was transmitted over a synchronous digital communications system. The message signal consists of synchronous transport modules; these are frame structures with a header and a payload. In the payloads of the synchronous transport modules, virtual containers may be nested, which also consist of a header and a payload. The virtual containers can be freely positioned in the payloads of the transport modules. A pointer in the header of each of the synchronous transport modules addresses the container. To compensate for bit-rate variations, the relative positions of containers of successive transport modules are changed. This is referred to as a pointer action, since the pointer which addresses the container is changed. Pointer actions cause so-called pointer jitter, which is to be reduced in the desynchronizer.

The desynchronizer shown in FIG. 1 works as follows. The payload of the message signal is written into a buffer BUF at the pulse rate of a write clock WCLK. The write clock WCLK is a clock signal derived from the received message signal. Advantageously, this clock signal is a signal with gaps for the headers of the frames, i.e., while a header is being received, a gap occurs in the clock signal, so that the header is not written into the buffer BUF. The write clock is generated by a clock recovery circuit (not shown).

The payload of the received message signal contains a useful signal, for example a plesiochronous or pseudo-synchronous message signal, which is to be recovered with its original bit rate. To recover the useful signal, the contents of the buffer BUF are read at a recovered clock rate RCLK. The recovered clock signal is generated by a tunable oscillator VCO, e.g., a voltage-controlled oscillator.

The tunable oscillator VCO is tuned with a tuning signal. According to the invention, this tuning signal is dependent on the average fill level of the buffer between two pointer actions. In the embodiment of FIG. 1, the tuning signal is generated as follows. A first counter CTR1 counts the pulses of the write clock signal WCLK. A second counter CTR2 counts the pulses of the recovered clock signal RCLK. When a pointer action occurs, both counters are reset by a detector DET for detecting the occurrence of pointer actions. At that instant, an adder DIF forms the difference of the two counts. The adder DIF is triggered by the detector DET via a trigger line TRIG on the occurrence of a pointer action. The difference value thus formed is converted into a voltage signal by a digital-to-analog converter. The voltage signal may advantageously be filtered with a low-pass filter TP. The filtered voltage signal serves as the tuning signal for the tunable oscillator.

The phase resolution is one bit, i.e., 1 UI. This is also the maximum wander that can be caused by the measures according to the invention. The average over the interval between two pointer actions is a measure of how much the effective bit rate of received virtual containers differs from the bit rate specified in ITU-T G.707, p. 6, i.e., a measure of the frequency offset of the synchronizer.

In the first embodiment, the average number of clock cycles by which the read clock RCLK differs from the write clock WCLK is determined. The averaging interval is the interval between two pointer actions. Either the interval between two successive pointer actions or a longer averaging interval, such as the interval between every tenth pointer action, is used. The detector determines the interval and triggers the formation of the difference between the accumulated write clock phase and the accumulated read clock phase. This difference signal is used to operate a phase-locked loop.

Thus, the clock-generating circuit described is an averaging digital phase detector, the averaging interval being determined by the characteristics of the input signal (pointer actions in the input signal) and thus having a variable length, so that pointer jitter caused by a constant offset of the effective bit rate of the received virtual containers is completely eliminated.

The desynchronizer is started by bringing the phase of the read clock signal RCLK at the instant of a detected pointer action to a predetermined position with respect to the phase of the write clock signal WCLK. This is not shown in FIG. 1.

Figure 2:
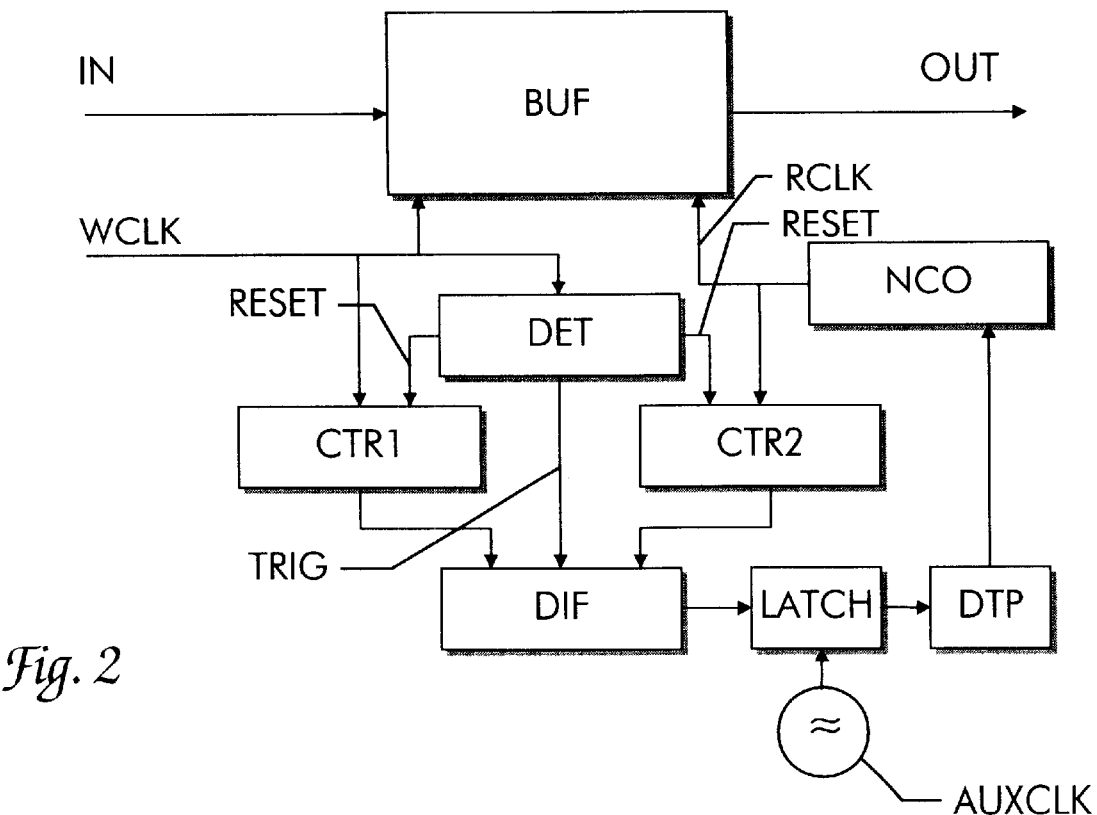
FIG. 2 is a block diagram of a second embodiment of a desynchronizer in accordance with the invention.

A second embodiment of a desynchronizer according to the invention is shown in block-diagram form in FIG. 2. The second embodiment differs from the first embodiment (FIG. 1) in that the difference value formed by the adder DIF is stored temporarily in a latch LATCH and read periodically at the pulse rate of an auxiliary clock signal. The sampling signal thus produced is filtered by a digital low-pass filter DTP and serves as the tuning signal for a numerically controlled oscillator NCO. The numerically controlled oscillator uses the highly stable system clock from the synchronous digital communications system, e.g., 2 Mb/s, and implements the clock alignment by means of switchable dividers.

This has the advantage that no expensive crystal oscillator with high phase stability is needed in the circuit, and that long integration times, such as integration over several pointer actions, can be implemented. If long integration times are to be achieved for the averaging, a clock generator with high phase stability is needed. In the second embodiment, this is accomplished by using the highly stable system clock (reference clock) from the synchronous digital communications system, which is tuned in the numerically controlled oscillator NCO by means of switchable dividers to generate the read clock for the buffer. In this manner, long integration times are made possible.

Figure 3:
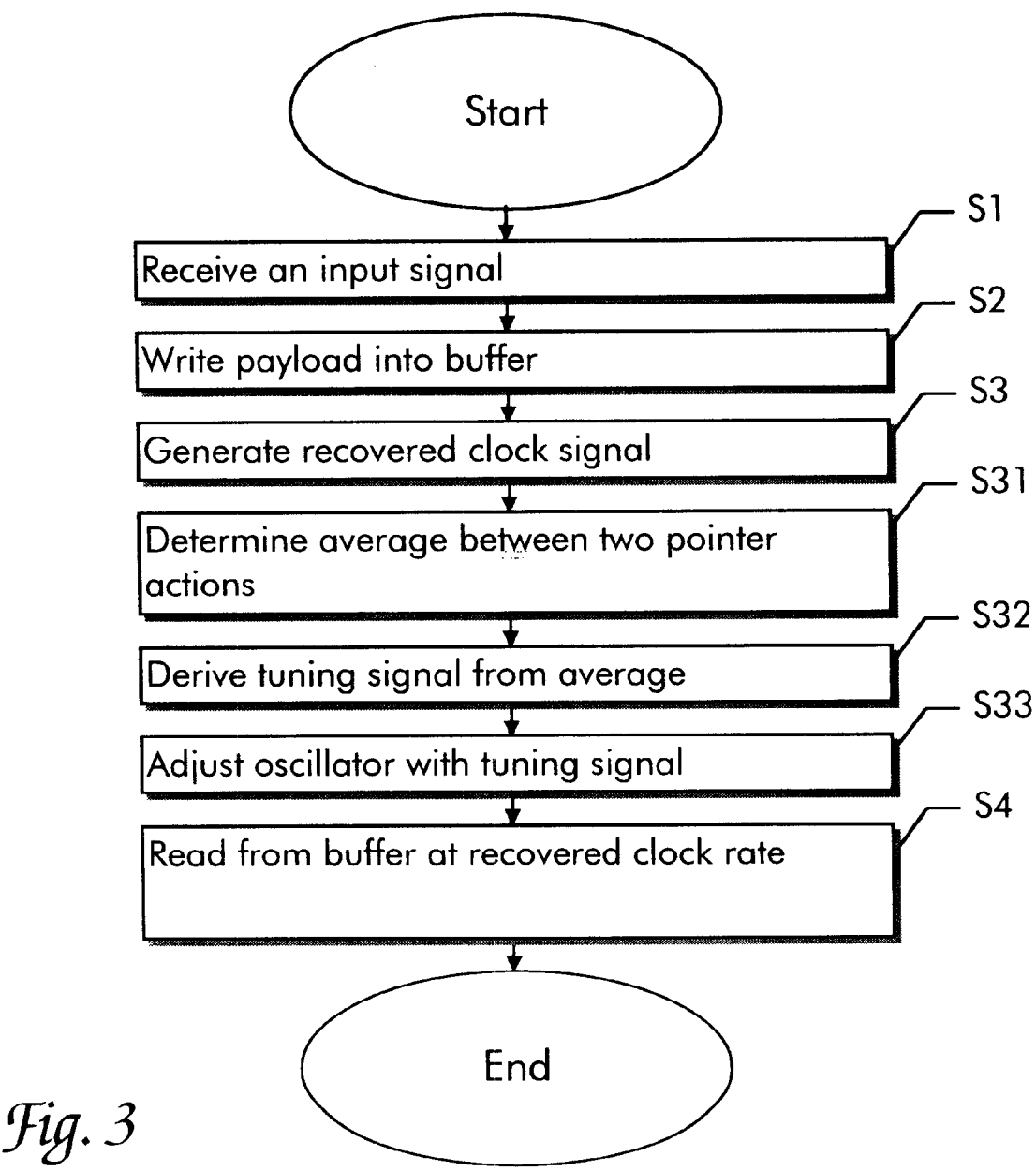
FIG. 3 shows a flowchart of the method in accordance with the invention.

FIG. 3 shows a flowchart of the method according to the invention. The method comprises the following steps:

S1: At an input, the desynchronizer receives a synchronous digital input signal. The input signal consists of synchronous transport modules, in whose payload one or more virtual containers are nested. The containers are addressed by a pointer in the header of the respective transport module and can be freely positioned within the payload.

S2: The payload of the input signal is written, at a write clock rate, into a buffer of the desynchronizer. The write clock is derived from the input signal with a clock recovery circuit. It may have gaps during the reception of headers.

S3: By means of a tunable oscillator, a recovered clock signal is generated. To accomplish this, in a first intermediate step S31, an average is taken over the interval between two pointer actions of the input signal. Then, in a second intermediate step S32, a tuning signal is derived either in the form of a voltage signal by means of a digital-to-analog converter or in the form of a digital signal. The tuning signal may advantageously be low-pass filtered. In a third intermediate step S33, the tunable oscillator is adjusted with the tuning signal.

S4: To recover the useful signal from the input signal, the contents of the buffer are read at the recovered clock rate.

What is claimed is:

1. A desynchronizer for a synchronous digital communications system for deriving a message signal from a synchronous digital input signal, said desynchronizer comprising:

storage means for storing the input signal, write means for writing the input signal into the storage means, clock-generating means for generating a recovered clock signal, and read means for reading from the storage means at the recovered clock rate the message signal at an original bit rate of said message signal, wherein clock-generating means comprises calculating means for determining an average phase difference value between read and write pulse rates during an interval between two pointer actions of the input signal and for deriving from the average phase difference value a tuning signal to adjust the recovered clock signal.

2. A desynchronizer as claimed in claim 1, further comprising low-pass-filter means for filtering the recovered clock signal.

3. A desynchronizer as claimed in claim 2 wherein the calculating means comprises:

detector means for detecting pointer actions occurring in the input signal;

first counter means for counting the pulses of a write clock signal;

second counter means for counting the pulses of the recovered clock signal; and adder means for subtracting the counts of the first and second counter means from each other to form a difference value, each of the two counters being connected to detector means via a respective reset line, so that both first and second counter means are reset on the occurrence of a point action.

4. A desynchronizer as claimed in claim 3, wherein the clock recovery means comprises, oscillator means for oscillating and digital-to-analog converter means for converting, for deriving the tuning signal from the difference value.

5. A desynchronizer as claimed in claim 3 wherein the clock recovery means comprises numerically controlled oscillator means for oscillating.

6. A method of deriving a message signal from a synchronous digital input signal, comprising:

receiving the synchronous digital input signal at a desynchonizer;

writing a payload of the input signal into a buffer of the desynchronizer;

generating a recovered clock signal; and reading from the buffer at a recovered clock rate to derive the message signal, further comprising:

determining an average phase difference value between read and write pulse rates during an interval between two pointer actions of the input signal;

deriving a tuning signal from the average phase difference value; and adjusting the recovered clock signal with the tuning signal.

7. A desynchronizer for a synchronous digital communications system for deriving a message signal from a synchronous digital input signal, said desynchronizer comprising:

a buffer that stores the input signal, a writing circuit that writes the input signal into the buffer, a clock-generating circuit that generates a recovered clock signal, and a reading circuit that reads from the buffer at a recovered clock rate the message, wherein the clock generating circuit comprises:

a calculating circuit that determines an average phase difference value between two pointer actions of the input signal and that derives from the average phase difference value a tuning signal which serves to adjust the recovered clock signal.

8. A desynchronizer as claimed in claim 7, further comprising:

a low-pass filter that filters the recovered clock signal.

9. A desynchronizer as claimed in claim 8, the calculating circuit further comprising:

a detector that detects pointer actions occurring in the input signal;

a first counter for counting the pulses of a write clock signal;

a second counter for counting the pulses of the recovered clock signal; and an adder for subtracting the counts of the first and second counters from each other to form a difference value, wherein each of the first and second counters are connected to the detector via a respective reset line, so that both first and second counters are reset on the occurrence of a pointer action.

10. A desynchronizer as claimed in claim 9, the clock-generating circuit further comprising:

a voltage-controlled oscillator and a digital-to-analog converter that derives the tuning signal from the difference value.

11. A desynchronizer as claimed in claim 9, the clock-generating circuit further comprising:

a numerically controlled oscillator.

\* \* \* \* \*